Patented Nov. 4, 1952

2,616,828

UNITED STATES PATENT OFFICE 2,616,828

METHOD OF ENZYMATIC RESOLUTION OF AMINO ACIDS

Leon Levintow and Jesse P. Greenstein, Silver Spring, Md., assignors to the United States of America as represented by the Administrator of the Federal Security Agency No Drawing. Application April 30, 1951, Serial No. 223,809

3 Claims. (Cl. 195—29)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to a process for the separation of optical isomers of certain racemic mixtures of amino acids. More particularly, this invention relates to a method for resolving a racemic mixture of an amino acid selected from the group consisting of DL-histidine and S-benzyl-DL-cysteine.

Heretofore, various amino acid racemic mixtures had been treated in such fashion as to separate one optical isomer but, in many cases, the remaining optical isomer was destroyed. Since many of the nutritionally important amino acid racemic mixtures are difficult and expensive to secure, even in the racemic form, it is highly important to provide a way to separate these racemic mixtures without destroying the amino acids themselves during the separation process. For example, in nutrition research, it frequently happens that one optical isomer, say the dextro rotatory form, is highly important nutritionally from the standpoint of its specific biological action, while the other component of the racemic mixture, say the levo rotatory isomer, might be wholly inactive or, on the contrary, possess a different specific effect. In order that the research biologists can understand which effect accompanies a particular isomer, it is obviously necessary to have a pure form of isomer and not a racemic mixture.

Accordingly, this invention has for an object the production of D-histidine and L-histidine from a racemic mixture consisting of DL-histidine. Another object is to resolve a racemic mixture of S-benzyl-DL-cysteine into its dextro and levo rotatory components, respectively. A further object is to accomplish the resolution of racemic mixtures of organic amino acids in such fashion as to recover each component of the racemic acid mixture. Other and further objects will be apparent as the ensuing description proceeds.

The foregoing and related objects are accomplished by this invention wherein a racemic amino acid mixture is resolved into its dextro rotatory and levo rotatory components by first forming the amides of such a racemic acid mixture, then incubating an aqueous solution of such amides at about 37° C. and at a pH between 9.0 and 9.5 in the presence of manganese ions and in the concurrent presence of hog kidney enzyme selectively to hydrolyze the levo acid amide while not substantially affecting the dextro acid amide, and then taking advantage of the solubility differences between the residual amide and the formed free acid to crystallize and separate the free levo acid from the unchanged dextro acid amide solution.

It will be seen from the foregoing that the racemic mixture is first converted into an amide of each component, then the amide of one component is selectively hydrolyzed by an enzymatic action whereby differences in solubility are produced between the residual unhydrolyzed amide and the liberated free acid.

It has been found that a soluble manganese salt such as, for example, manganese sulphate, acetate and, preferably manganese chloride, in the mixture undergoing hydrolysis, markedly catalyzes the enzymatic hydrolysis with which the instant invention is concerned. As is usual with animal enzymes, the hydrolysis takes place to best advantage at a temperature of approximately 37° C. Temperatures substantially higher than 37° tend to inactivate the enzyme, while temperatures substantially lower than 37° fail to secure an optimum hydrolysis.

In accordance with this invention, the hydrolysis operates satisfactorily at a solution pH between about 9.0 and 9.5, that is to say, at an alkaline solution reaction. After completing the hydrolysis, the solution is brought to slight acidity by the addition of acetic acid or the like, and the liberated free acid is separated by crystallization.

It has been found that the amide of the levo isomer is selectively hydrolyzed to yield the free acid, while the dextro rotatory isomer is not substantially affected by the hog kidney enzyme employed.

The following examples show how this invention may be carried out, but it is not limited thereto:

The hog kidney preparation for the resolutions of histidine and S-benzyl-cysteine was prepared as follows. 3500 gm. of freshly frozen hog kidney were allowed to thaw, ground in a Waring Blendor with 7 liters of cold water, and strained through gauze. The original homogenate had an activity of 8 against 0.05 M DL-histidine amide and an activity of 22 against 0.05 M S-benzyl-DL-cysteine at pH 9.2. The extract was centrifuged at 20 minutes at 600×gravity and the precipitate, $P_1$, discarded. Cold 60 per cent alcohol was added to the supernatant, $S_1$, to a final concentration of 8 per cent, the temperature being lowered simultaneously to −3°. Cold 0.5 N acetic acid was added to lower the pH to 6.3. After 12 hours the precipitate, $P_2$, was removed in the Sharples centrifuge and the clear supernatant, $S_2$, taken to 20 per cent alcohol, pH 5.6, −9° for 12 hours. The active precipitate, $P_3$, was recovered in the Sharples centrifuge, taken up in 1200 cc. of water, and adjusted to pH 7.0. This fraction, $P_3$, which was employed for the resolutions, had an activity of 31 against histidine amide and 168 against S-benzylcysteine amide. In the presence of 0.01 M $Mn^{++}$, these activities were increased to 139 and 570, respectively.

*DL-histidine amide hydrochloride.*—150 gm. of DL-histidine monohydrochloride were converted into the methyl ester dihydrochloride and recrystallized from methyl alcohol-ether. 120 gm. of this ester salt were dissolved in 1200 cc. of dry methanol saturated at 0° with dry ammonia. After 4 days at 20°, removal of the solvent yielded 75 gm. of DL-histidine amide monohydrochloride, which was recrystallized from water-acetone mixtures; M. P. 233° with decomposition. Calculated N 29.4, Cl 18.6 per cent; found N 29.4, Cl 18.3 per cent.

*S-benzyl-DL-cysteine amide hydrochloride.*—180 gm. of S-benzyl-DL-cysteine were suspended in 1800 cc. of methyl alcohol and the mixture saturated with dry HCl gas. On evaporation in vacuo, 135 gm. of the corresponding methyl ester hydrochloride were obtained. After crystallization from methanol-ether, the compound melted at 112°. Calculated N 5.3, Cl 13.6 per cent; found N 5.2, Cl 13.5 per cent.

120 gm. of the methyl ester hydrochloride were dissolved in 1200 cc. of methanol saturated at 0° with ammonia. After standing 4 days at 20°, the solvent was removed and the residual amide hydrochloride was crystallized from alcohol in the form of needles. The yield was 72 per cent of theory; M. P. 188–190°. Calculated N 11.4, Cl 14.4 per cent; found N 11.3, Cl 14.5 per cent.

*Preparation of L-histidine and S-benzyl-L-cysteine.*—Solutions were prepared of 98 gm. of DL-histidine amide hydrochloride in 800 cc. of water and 24 gm. of S-benzyl-DL-cysteine amide hydrochloride in 200 cc. of water. The histidine amide solution was adjusted to pH 9.0, 150 cc. of the hog kidney enzyme preparation were added, manganese chloride was added to a final concentration of 0.01 M, and finally enough distilled water was added to bring the total volume to 10 liters. The S-benzyl-cysteine amide solution was also adjusted to pH 9.0, 100 cc. of the hog kidney enzyme preparation were added, manganese chloride was added to a final concentration of 0.01 M, and enough distilled water to bring the total volume to 2 liters. In all cases, enough enzyme preparation was added to bring about the theoretical maximal hydrolysis in 2 to 4 hours.

The digests were allowed to stand at 37° for several hours. Aliquots were removed from time to time in order to follow the hydrolysis by manometric-$CO_2$ analyses. To be completely sure of the completion of hydrolysis, more enzyme was added to each digest, and the digestion allowed to proceed for several hours beyond the point at which maximal hydrolysis (50 per cent of the racemate) had occurred.

At the end of the digestion period, the digests were each brought to pH 5 by addition of glacial acetic acid, shaken with and filtered through norit, and evaporated in vacuo to a small volume. During this evaporation the S-benzyl-L-cysteine crystallized; the crystals were filtered off and dried. The yield of this compound was 10.3 gm., or 95 per cent of theory. The condensate from the histidine amide digest, about 200 cc., was brought to pH 7.0 by addition of lithium hydroxide, and hot absolute alcohol was added to 80 per cent. The crystals of L-histidine were filtered off, washed with alcohol, and dried. The yield was 32 gm. or 84 per cent of theory.

The crude S-benzyl-L-cysteine was dissolved in a little warm dilute HCl, treated with norit, and filtered. The filtrate was chilled and treated with dilute ammonia to pH 6.0. The hexagonal prisms of the pure compound were filtered, washed thoroughly with water, and dried; yield 6.0 gm. The crude L-histidine was recrystallized from a little hot water with the aid of norit, and yielded 18 gm. of pure, dried product. The optical and analytical data on these purified preparations are given in Table I.

*Preparation of D-histidine and S-benzyl-D-cysteine.*—The mother liquors and washings from the respective preparations of the L-amino acids were each combined, evaporated in vacuo to a small volume, and chilled to 5°. Ice-cold 5 N sodium hydroxide was added dropwise to each concentrate until the pH was about 11. 4 liters of acetone were then added, the mixture shaken thoroughly, and the acetone layer decanted and filtered. The residual aqueous layer of each concentrate was extracted three times in similar fashion with acetone. The respective acetone extracts were combined, evaporated nearly to dryness, and again extracted with acetone. This procedure was repeated until no turbidity occurred, when fresh acetone was added to the previous condensate. The acetone extracts were then evaporated in vacuo nearly to dryness, taken up in about 5 times the amount of 3 N hydrobromic acid, and refluxed for 1 hour. The solution was treated with norit, filtered, and evaporated in vacuo to dryness.

The hydrolysate containing S-benzyl-D-cysteine was dissolved in a little water, filtered, and treated with dilute ammonia to pH 6.0. The resulting crystals were filtered, washed thoroughly with water, and dried; yield 6.0 gm., or 56 per cent of theory. The D-histidine hydrolysate was dissolved in a little water, the solution brought to pH 7.0 with dilute ammonia, and hot absolute alcohol added to 80 per cent. After filtering and drying the resulting crystals, the yield was 8.2 gm. Recrystallization from hot water yielded 6.2 gm. of pure D-histidine, or 17 per cent of theory. A second preparation of D-histidine gave no better yield than this. The optical and analytical data on these purified preparations are given in Table I.

*Conversion of isomeric S-benzylcysteines to corresponding cystines.*—The S-benzyl-L-cysteine and S-benzyl-D-cysteine were converted to the corresponding isomeric cystines by the sodium-liquid ammonia procedure of Wood and du Vigneaud. The optical and analytical data for these isomers are given in Table I.

TABLE I

*Specific rotations at 25° of optical isomers of racemic amino acids resolved by asymmetric enzymatic hydrolysis of their amides* [1]

| Compound | Present Data | | | | | Data in literature | |
|---|---|---|---|---|---|---|---|
| | L form | | D form | | N calculated | L form | D form |
| | (Alpha)$_D$ | N-observed | (Alpha)$_D$ | N-observed | | (Alpha)$_D$ | (Alpha)$_D$ |
| | Degrees | Percent | Degrees | Percent | Percent | Degrees | Degrees |
| Histidine | [2] −39.7 | 26.9 | +39.6 | 27.0 | 27.1 | −39.7 | +39.8 |
| S-Benzylcysteine | +25.5 | 6.6 | −25.0 | 6.6 | 6.6 | [3] +23.5 +22.7 | −22.5 |
| Cystine | −220.0 | 11.6 | +221.2 | 11.6 | 11.7 | −214.4 | +224.0 |

[1] 2 dm. tube employed.
0.40 percent solution in 1.0 N HCl.
[2] 1.42 percent solution in water.
1.48 percent solution in water.
1.00 percent solution in 0.965 N NaOH.
[3] At a temperature of 26.5°.

It will be seen from the foregoing that this invention provides a simple way to resolve a racemic acid mixture by taking advantage of the ability of hog kidney enzyme to hydrolyze selectively the amide of the levo rotatory amino acid isomer. Once the levo component is hydrolyzed to the free acid, the solubility differences between the free acid and the residual amide readily enable a substantially quantitative separation to be accomplished. One of the marked advantages of this invention is that each isomer can be separately recovered without destroying the desired acid radical. Obviously, the residual amide in solution, which is composed of the dextro rotatory component, can be further isolated from the mother liquor by evaporation and crystallization.

Since many apparently differing embodiments of the invention will occur to one skilled in the art, it will be apparent that various changes can be made in the detailed embodiments hereinabove described without departing from the spirit and scope of this invention.

What is claimed is:

1. A process for resolving a racemic amino acid selected from the group consisting of DL-histidine and S-benzyl-DL-cysteine which comprises first forming the amide of such a racemic acid, then incubating an aqueous solution of such amide at about 37° C. and a pH between about 9.0 and 9.5 in the presence of manganese ions and hog kidney enzyme selectively to hydrolyze the levo acid amide while not substantially affecting the dextro acid amide, and removing and separating the free levo acid from the unchanged dextro acid amide solution.

2. A process for resolving DL-histidine into D-histidine which comprises first forming the amides of DL-histidine, then incubating an aqueous solution of such amides at about 37° C. and a pH between about 9.0 and 9.5 in the presence of manganese ions and hog kidney enzyme to hydrolyze selectively the levo acid amide, and separating by crystallization the L-histidine from dissolved amide of D-histidine.

3. A process for resolving S-benzyl-DL-cysteine into S-benzyl-D-cysteine and S-benzyl-L-cysteine which comprises first forming the amides of S-benzyl-DL-cysteine, then incubating an aqueous solution of such amides at about 37° C. and at a pH between about 9.0 and 9.5 in the presence of manganese ions and hog kidney enzyme to hydrolyze selectively the levo acid amide, and separating the S-benzyl-L-cysteine from the unchanged amide of S-benzyl-D-cysteine.

LEON LEVINTOW.
JESSE P. GREENSTEIN.

REFERENCES CITED

The following references are of record in the file of this patent:

UNITED STATES PATENTS

| Number | Name | Date |
|---|---|---|
| 2,511,867 | Neuberg | June 20, 1950 |